United States Patent
Takahashi et al.

[11] Patent Number: 5,915,059
[45] Date of Patent: Jun. 22, 1999

[54] OPTICAL FIBER CABLE AND A METHOD FOR MANUFACTURING THE SAME

[75] Inventors: Masao Takahashi, Fujisawa; Sakae Ikuta, Tokyo; Keiko Matsumoto, Kyoto; Kiyohisa Terai, Yokohama, all of Japan

[73] Assignee: Kabushiki Kaisha Toshiba, Kawasaki, Japan

[21] Appl. No.: 08/878,967

[22] Filed: Jun. 19, 1997

[30] Foreign Application Priority Data

Jun. 25, 1996 [JP] Japan .................................. 8-164661

[51] Int. Cl.⁶ ......................................................... G02B 6/44
[52] U.S. Cl. .......................... 385/128; 385/109; 385/102; 385/11; 385/147
[58] Field of Search ..................... 385/109, 100, 385/102, 11, 123, 127, 128, 146, 145

[56] References Cited

U.S. PATENT DOCUMENTS

| | | | |
|---|---|---|---|
| 4,750,796 | 6/1988 | Shibata et al. | 385/145 |
| 4,770,493 | 9/1988 | Ara et al. | 350/96.3 |
| 4,787,707 | 11/1988 | Kitayama et al. | 350/96.23 |
| 4,801,186 | 1/1989 | Wagatsuma et al. | 350/96.3 |
| 4,904,052 | 2/1990 | Raud et al. | 385/128 |
| 4,913,521 | 4/1990 | Tajima et al. | 385/126 |
| 5,095,514 | 3/1992 | Curtis | 385/123 |
| 5,111,524 | 5/1992 | Schunk et al. | 385/102 |
| 5,268,984 | 12/1993 | Hosoya et al. | 385/128 |
| 5,309,533 | 5/1994 | Bonniau et al. | 385/11 |
| 5,323,481 | 6/1994 | Tokumaru et al. | 385/137 |
| 5,333,229 | 7/1994 | Sayegh | 385/102 |
| 5,668,908 | 9/1997 | Cordova | 385/128 |
| 5,703,988 | 12/1997 | Oishi et al. | 385/128 |

FOREIGN PATENT DOCUMENTS

| | | |
|---|---|---|
| 0 151 743 | 8/1985 | European Pat. Off. . |
| 2 545 943 | 11/1984 | France . |
| 25 33 144 | 2/1976 | Germany . |
| 31 47 137 | 6/1983 | Germany . |
| 37 24 997 | 8/1988 | Germany . |

*Primary Examiner*—Hung N. Ngo
*Attorney, Agent, or Firm*—Oblon, Spivak, McClelland, Maier & Neustadt, P.C.

[57] ABSTRACT

An optical fiber has a core structure and a first coating layer covering the core structure. The optical fiber, after being twisted, is covered at its outer side with a second coating layer. The second coating layer is higher in Young's modulus than the first coating layer. As a result, the twisting of the optical fiber is stably retained by the second coating layer. Further, an outer force coming from the second coating layer is absorbed by a soft first coating layer, so that no compressive force acts on a core and cladding in the optical fiber.

24 Claims, 6 Drawing Sheets

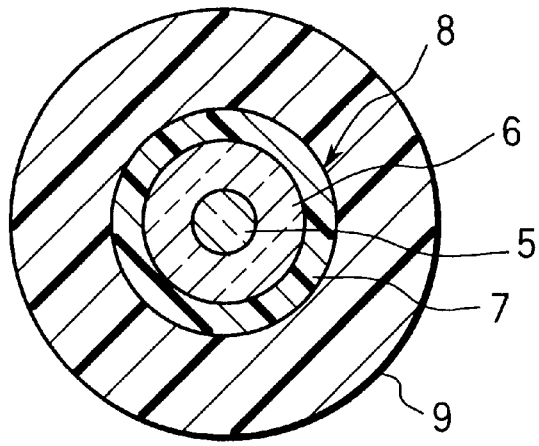
F I G. 1
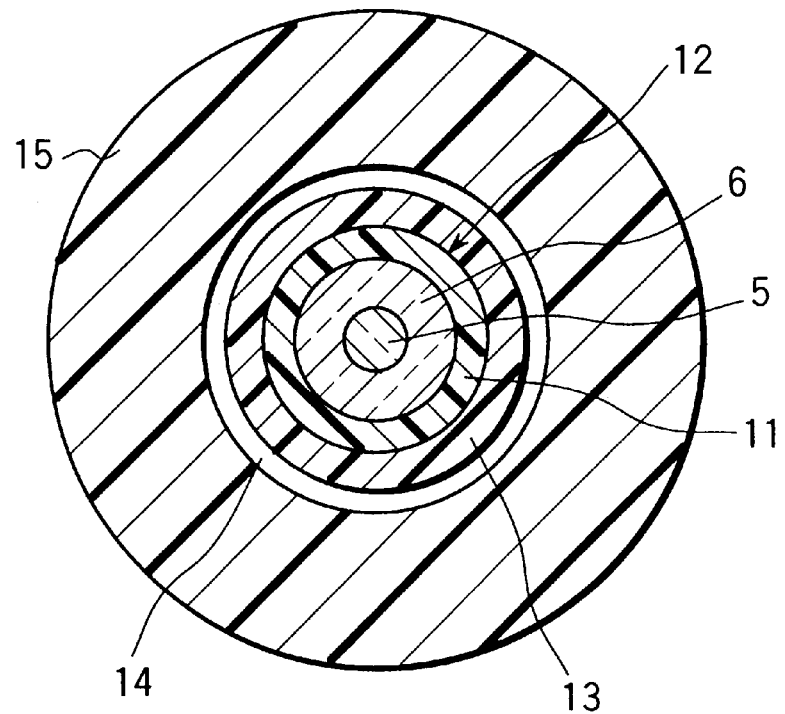
F I G. 2

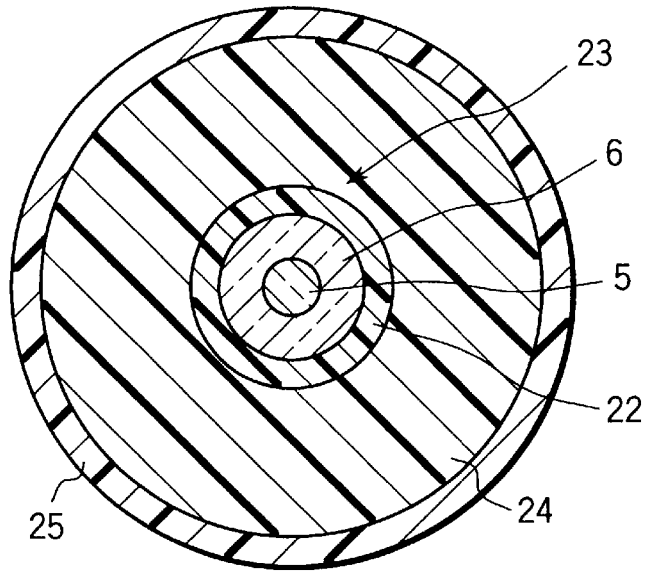
F I G. 7
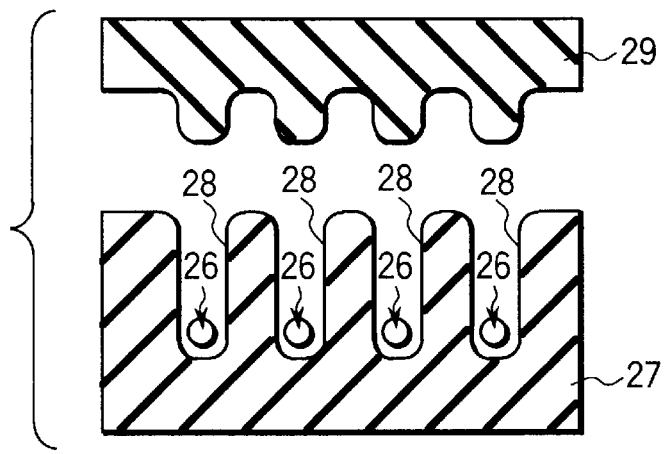
F I G. 8
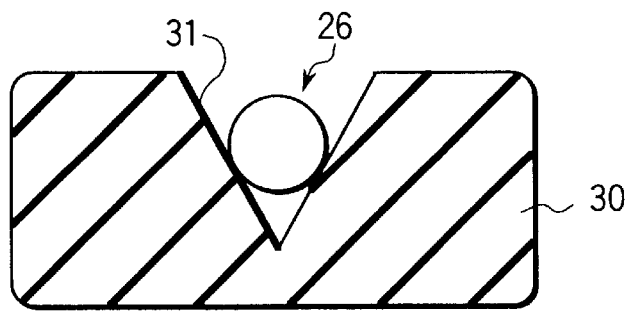
F I G. 9

OPTICAL FIBER CABLE AND A METHOD FOR MANUFACTURING THE SAME

BACKGROUND OF THE INVENTION

The present invention relates to an optical fiber cable for use in communications and measurement and, in particular, an optical fiber cable having a coated optical fiber cable and a method for manufacturing the same, as well as an optical fiber coil using the optical fiber cable.

The optical fiber cable using the optical fiber is excellent over a copper-incorporated cable core in terms of its non-conduction, small diameter, light weight and flexibility and advantageous over it in terms of its low loss, broad bandwidth, etc. For this reason, the development of the cable as a new communications transmission path has been progressed and it is fastly accepted over a wider range of application.

Further, the optical fibers are not affected by a thunderstroke and electromagnetic noise and the development of optical fiber-incorporated sensors for measuring the voltage, current and magnetic field has now been under way. An optical fiber type magnetic field sensor using the Faraday effect may be listed by way of example. This sensor is placed in the magnetic field with the optical fiber cable in a coiled state and the rotation of polarization of a light beam passing through the optical fiber is measured to obtain the strength of a magnetic field from that rotation angle. Thus, the phenomenon of the rotation of polarization of a light beam in a magnetic field is called as the Faraday effect.

With reference to FIG. 12, explanation will be given below about an optical fiber cable using a single mode fiber capable of transmitting one mode in an available wavelength, as one example of the optical fiber cable for use in communications and measurement. The optical fiber 1 comprises a core 2 for allowing a light beam to be actually transmitted therethrough and a cladding 3 provided around the core 2 and somewhat smaller in refractive index than the core 2. As the material for the core 2 and cladding 3 use is widely made of quartz. Any slight injury, being produced in the quartz surface, grows under a tension force, temperature expansion/contraction, moisture penetration, etc., into an eventual destruction.

In the manufacturing process of the ordinary optical fiber 1, a protective coating layer 4 is provided around the cladding 3 to provide an optical fiber cable. As a result, it is possible to prevent the generation of such an injury in the optical fiber resulting from the contacting of moisture and dirt in the air and hence to achieve enhanced reliability. As a material for the protective coating layer 4 use is made of an ultraviolet-curing type resin or thermosetting type resin such as silicone rubber.

The single mode optical fiber cable as set out above has its inner optical fiber 1 (cladding 3 and core 4) compressed by the thermal expansion of the protective coating layer 4 and involves undesired dispersion and birefringence. In order to handle this problem, the twisting of the optical fiber has been widely practiced. The reason is that the specific twisting of the optical fiber allows the dispersion to be reduced to zero and ensures the long-distance communications.

Further, owing to the twisting of the optical fiber and hence the reduction of the birefringence, the optical fiber type magnetic field sensor utilizing the Faraday effect can accurately measure the magnetic field.

In the case where such twisting is imparted to the optical fiber 1, the retaining of the twisting is achieved by fitting a connector over each corresponding end of the optical fiber or applying an adhesive to each corresponding end.

However, the optical fiber cable as set out above has encountered the following problems. That is, with the optical fiber 1 fitted as set out above so as to retain the twisting of the optical fiber, there arises a risk of a dispersion/birefringence occurring at that fitting site. In the case where the optical fiber is used in a bent state, a radially small curve is liable to be produced locally, thus providing a cause for birefringence. Further, the twisted optical fiber 1, unless being so mounted as to be retained at all times under a constant tension force, there is a possibility that the twisted optical fiber will be entangled.

In the case where, as the material for the protective coating layer 4, use is made of a thermosetting type or room temperature-curing silicone, the following problem is presented. That is, since the thermosetting type silicon rubber is cured at high temperature to cover the optical fiber therewith, there have sometimes the cases that, in use under the ordinary temperature, stress (compression) acts upon the optical fiber 1 under the compression of the silicone rubber and hence a dispersion and birefringence arise. Further, even in the room temperature-curing type silicon rubber, the optical fiber 1 is also compressed at a time of curing, thus providing a cause for dispersion and birefringence.

BRIEF SUMMARY OF THE INVENTION

One object of the present invention, being conceived with the above-mentioned prior art in view, is to provide an optical fiber cable which can be mounted with the twisting of an optical fiber accurately retained in place and can prevent a dispersion/birefringence which might otherwise be involved in the prior art optical fiber cable.

Another object of the present invention is to provide an optical fiber coil which can prevent any unwanted local bending of an optical fiber resulting from a dispersion/birefringence.

In another aspect, an object of the present invention is to provide a method for manufacturing an optical fiber cable which can prevent a dispersion/ birefringence which might otherwise be involved in the prior art optical fiber cable.

A first aspect of the present invention is to provide an optical fiber cable comprising an optical fiber having a core structure and a first coating layer covering the core structure, and a coating layer structure including a second coating layer covering the first coating layer, the second coating layer being higher in Young's modulus than the first coating layer.

It is to be noted that the core structure comprises a core and a cladding provided on the outer periphery of the core. Further, it is preferable that the optical fiber be twisted with a twisting rate which can prevent generation of the birefringence.

In the arrangement as set out above, since the second coating layer is higher in Young's modulus than the first coating layer, when the optical fiber is twisted, the second coating layer retains the twisting of the optical fiber stably. As a result, an outer force on the second coating layer is absorbed by the first coating layer comprised of a softer coating layer and any coating injury, such as a coating separation, is protected by the second coating layer comprised of a harder coating layer.

A second aspect of the present invention is to provide an optical fiber cable comprising an optical fiber having a core structure and a first coating layer covering the core structure, and a coating layer structure including a second coating layer covering the first coating layer, the second coating layer being so formed as to produce no stress, in a cured/shrunk state, relative to the first coating layer. Further, it is preferable that the optical fiber be twisted with a twisting rate which can prevent generation of the birefringence.

According to this arrangement, since the second coating layer is so formed as to makes its inner diameter substantially equal to an outer diameter of the first coating layer in a cured/shrunk state. As a result, a stress on the optical fiber is lowered to decrease a birefringence.

A third aspect of the present invention is to provide an optical fiber cable comprising an optical fiber and a coating layer structure having a specific coating layer with a clearance of a given size provided on an inner side as to restrict an external force which acts on the specific coating layer from being transmitted to the optical fiber.

According to this arrangement, the clearance is provided between the specific coating layer and an adjacent coating layer of the optical fiber to enable any thermal expansion difference to be absorbed in the clearance, a stress on the optical fiber to be reduced and a birefringence to be lowered.

A fourth aspect of the present invention is to provide an optical fiber cable comprising an optical fiber having a core structure and a first coating layer covering the core structure, and a coating layer structure having a second coating layer, the second coating layer being so formed as to produce a given polarization plane in the optical fiber. Further, it is preferable that the optical fiber be twisted with a twisting rate which can prevent generation of the birefringence.

According to this arrangement it is possible to control the polarization plane of the optical fiber and, by doing so, it is possible to obtain an optical fiber of high birefringence.

In the case where the optical fiber is used for a sensor in coil format, a linear refringence acts upon the optical fiber as one for canceling a "bending-caused" birefringence, thus achieving a lowering in the birefringence.

The fifth aspect of the present invention is to provide an optical fiber cable comprising an optical fiber having a core structure and a first coating layer covering the core structure, and a coating layer structure having an outermost coating layer formed of a fluorine resin. Further, it is preferable that the optical fiber be twisted with a twisting rate which can prevent generation of the birefringence.

According to this arrangement of the present invention, the optical fiber is protected by the fluorine resin coating layer. Further, since the outermost coating layer is formed of the fluorine resin, the optical fiber cable can improve a high resistance to chemicals and be used for an extended period of time without degrading the coating layer.

The sixth aspect of the present invention is to provide an optical fiber cable comprising an optical fiber and a guide having at least one groove in which the optical fiber is held in place.

According to this arrangement, the optical fiber is held in the groove of the guide and it is, therefore, possible to suppress any kink of the optical fiber to which twisting is imparted to allow the lowering of the birefringence.

The seventh aspect of the present invention is to provide an optical fiber coil comprising a former and a guide provided on and around the former and having a groove formed along a turn direction of the optical fiber, the groove holding the optical fiber in place.

The eighth aspect of the present invention is to provide a method for manufacturing an optical fiber cable comprising the steps of:

forming an optical fiber and twisting the optical fiber at a given twisting rate, the optical fiber comprising a core, a cladding covering the core and a first coating layer; and forming a second coating layer, by an extrusion process, on an outside of the first coating layer of the optical fiber.

By forming the second coating layer of the optical fiber by the extrusion process it is possible to readily adjust a clearance between the optical fiber and a coating layer extruded as the second coating layer and to lower a stress acting on the optical fiber and hence a birefringence.

The other features and advantages of the present invention will be apparent from reading the following explanation by referring to the accompanying drawing.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view in vertical cross-section showing an optical fiber cable according to a first embodiment of the present invention;

FIG. 2 is a view in vertical cross-section showing an optical fiber cable according to a second embodiment of the present invention;

FIG. 7 is a view, in vertical cross-section, showing an optical fiber cable according to a fifth embodiment of the present invention;

FIG. 8 is a view, in vertical cross-section, showing an optical fiber cable according to a sixth embodiment of the present invention;

FIG. 9 is a view, in vertical cross-section, showing an optical fiber cable according to a seventh embodiment of the present invention;

DETAILED DESCRIPTION OF THE INVENTION

Figure 3:
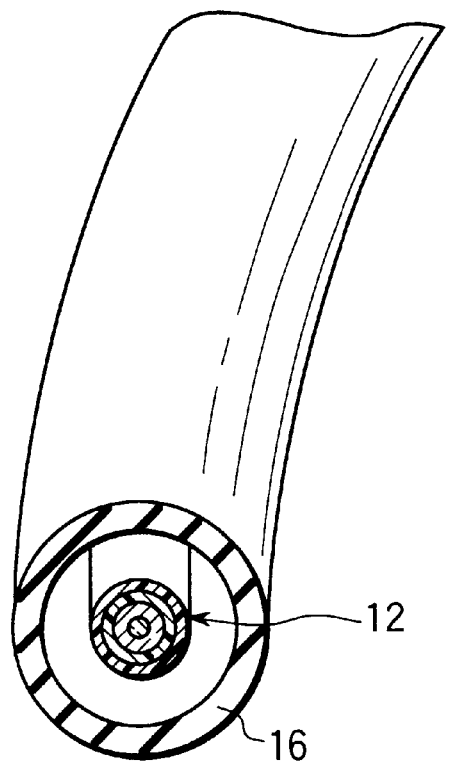
FIG. 3 is a view, partly in vertical cross-section and partly taken away, showing an optical fiber cable according to a third embodiment of the present invention.

The embodiments of the present invention will be explained below with reference to the drawing.

(1) First Embodiment

The arrangement of the first embodiment according to the present invention will be explained below with reference to FIG. 1.

In the manufacture of an optical fiber cable according to the first embodiment of the present invention, a core structure comprising a core 5 and a cladding 6 is subjected to a first coating layer 7 as shown in FIG. 1 to provide an optical fiber 8. As the first coating layer 7 use is made of thermosetting or ultraviolet-curing type silicone rubber of a low Young's modulus.

Then, twisting is given to the resultant optical fiber 8 on the basis of an initially determined twisting rate and a second coating layer 9 is made on the coated optical fiber. It is preferred that the twisting rate applied to the optical fiber 8 be so properly determined as to achieve the reduction of the dispersion or birefringence in accordance with the use to which the optical fiber is put.

As the material for the second coating layer 9, use is made of the thermosetting-or room temperature-curing type silicone rubber higher in Young's modulus than the first coating layer 7. Though being not shown, the ejecting outlet section of a die for extruding process has a double tube structure comprised of inner and outer tubes. The ejecting outlet section is defined by the outer surface of the inner tube and inner surface of the outer tube to provide a ring-like outlet. In consequence, the material for the second coating layer 9 is extruded as a cylindrical form out of the ring-like outlet.

The optical fiber 8 having the first coating layer 7 is passed through the interior of the inner tube at a constant rate of speed while, at the same time, the material silicone rubber for the second coating layer 9 is extruded out of the ring-like outlet at the same rate of speed as that of the optical fiber 8. By doing so, the second coating layer is applied to the first coating layer 7 of the optical fiber 8. The outer diameter of the inner tube at the ring-like outlet is so formed as to be made greater than the outer diameter of the optical fiber 8 having the first coating layer 7. In this case, with the second coating layer 9 cured in a shrunk state, the inner diameter of the second coating layer 9 is so set as to be equal to the outer diameter of the first coating layer 7 which is cured in a shrunk state.

The operation and advantage of the optical fiber cable so manufactured are as follows.

By the second coating layer 9, the twisted state of the optical fiber 8 covered with the first coating layer 7 is retained and, since the Young's modulus of the second coating layer 9 is higher than that of the first coating layer 7, ensures added retainability. The second coating layer 9, being hard, is effectively prevented from being damaged, such as being peeled.

As the first coating layer 7, use is made of the thermosetting and ultraviolet-curing type resin and, in this case, the material for the first coating layer is of such a type as to be smaller in Young's modulus than that for the second coating layer 9. Even if any external force acts upon the optical fiber cable, it is absorbed by the soft, first coating layer 7 so that the core 5 and cladding 6 in the optical fiber are prevented from being pressed. Even if the second coating layer 9 is thermally expanded due to a temperature variation involved during use, this is absorbed by the first coating layer 7 so that it is possible to reduce stress on the core 5 and cladding 6.

Further, in the optical fiber cable of the first embodiment, an outer force on the optical fiber 8 covered with the first coating layer 7 can be reduced to zero during use in room (ordinary) temperature. That is, the die used in the extrusion process is so set that, with the silicone rubber of the second coating layer 9 cured in the shrunk state, the inner diameter of the second coating layer 9 is equal to the outer diameter of the optical fiber 8, that is, the optical fiber having the first coating layer 7. It is, therefore possible to realize an optical fiber structure whose stress can be reduced to zero and hence to properly prevent the generation of the dispersion and refringence.

(2) Second Embodiment

The second embodiment of the present invention will now be explained below with reference to FIG. 2.

First, the arrangement of the second embodiment will be explained below. That is, an optical fiber 12 comprising a core 5, a cladding 6 and a first coating layer 11 covered on the cladding is twisted and covered with a second coating layer 13 so that the twisting state is retained and fixed. Then a third coating layer 15 is provided around the second coating layer 13 with a gap 14 provided relative to the second coating layer, noting that the third coating layer 15 is harder in material than the second coating layer 13.

The operation and advantage of the second embodiment are as follows. That is, since the gap 14 is provided between the second coating layer 13 and the third coating layer 15, the optical fiber 12 side is not affected by the thermal expansion of the third coating layer 15 and the third coating layer 15 is formed with the use of a harder material than that of the second coating layer 13.

As a result, it is possible to reduce stress on the core 5 and cladding 6 to a minimal extent by reducing the Young's modulus of the first coating layer 11. Even the second coating layer 13 which might cause thermal expansion on the optical fiber 12 side can be formed as being relatively soft in a Young's modulus (hardness) of an extent necessary to fix the twisting state of the first coating layer 11. It is, therefore, possible to prevent generation of a dispersion and refringence. Since the outer protection of the optical fiber is achieved by a harder coating layer 15, the optical fiber can be positively prevented from being injured.

If the optical fiber cable is so structured as shown in FIG. 2, the second coating layer 13 is not necessarily made greater in Young's modulus than the first coating layer 11. Further, the die as explained in conjunction with the first embodiment is not necessary in the formation of the second coating layer 13. The ordinary process, such as the drawing process, may be used instead.

By fixing the twisting state of the optical fiber 12 at both ends, for example, by a fixing member such as a connector, it is possible to omit the second coating layer of the optical fiber.

(3) Third Embodiment

The third embodiment of the present invention will be explained below with reference to FIG. 3.

First, the arrangement of the present embodiment will be explained below. That is, the third embodiment is of such a type that an optical fiber 12 covered with a first coating layer 11 and a second coating layer 13 in the second embodiment is inserted into a flexible tube 16 and a gap of a predetermined size is created between the tube 16 and the outer surface of the optical fiber 12.

The arrangement of the third embodiment has the following advantage.

Since, in the third embodiment, the optical fiber 12 is inserted into the tube 16, no consideration needs to be paid to an adverse influence exerted by the thermal expansion of the covering over the optical fiber. Further, the gap between the optical fiber 12 and the tube 16 serves as a buffer, so that the optical fiber 12 is protected. It is, therefore, possible to prevent the generation of a dispersion and birefringence, as well as an injury, in the optical fiber 12.

In the third embodiment, although use is made of the optical fiber 12 covered with the second coating layer 13, it may go without either the second coating layer 13 or the first and second coating layer 11 and 13. In this case, a specific means is required at both end sections of the optical fiber so as to retain the twisted state of the optical fiber.

(4) Fourth Embodiment

Figure 4:
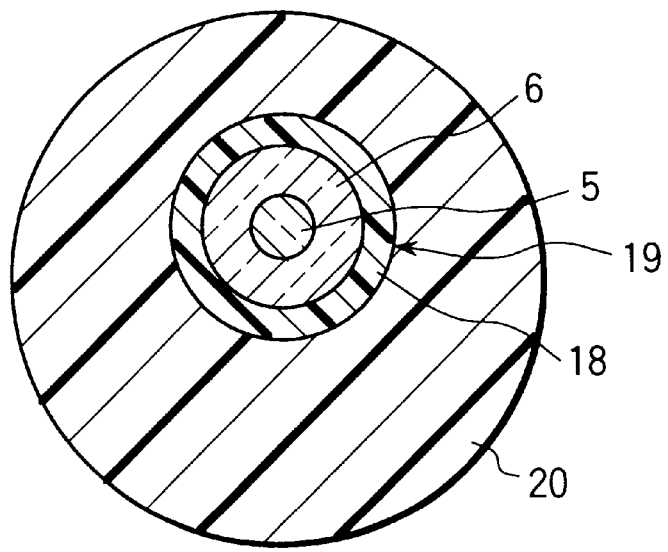
FIG. 4 is a view, in vertical cross-section, showing an optical fiber cable according to a fourth embodiment of the present invention.

The fourth embodiment of the present invention will be explained below with reference to FIG. 4.

In the fourth embodiment, an optical fiber comprising a core 5 and a cladding 6 around the core and a first coating layer 18 and this optical fiber is twisted to provide an optical fiber structure 19. A second coating layer 20 is covered on the first coating layer 18 and, at this time, the center of the optical fiber 19 is displaced from the center of the second coating layer 20, that is, off-centered in one direction relative to the second coating layer 20.

The second coating layer 20 may be formed on the first coating layer 18 of the optical fiber with the use of a die having a double-walled ejecting outlet section as in the first embodiment but it may also be formed with the usual coating method such as the drawing method.

The thus formed embodiment has the following advantage.

That is, according to the arrangement of the fourth embodiment, it is possible to readily achieve a higher birefringent optical fiber structure (polarization-retained optical fiber structure).

Assuming that, unlike the fourth embodiment, the second coating layer has its center coincide with that of the optical fiber in the fourth embodiment, a uniform compression force acts upon the optical fiber in all directions, so that the consequent birefringence is reduced to a minimum.

In the fourth embodiment, however, the center of the optical fiber 19 is shifted away from that of the second coating layer 20 and the optical fiber 19 is off-centered relative to the second coating layer 20, so that the thickness of the second coating layer 20 differs all around the optical fiber 19 and the balance of compression forces is broken. That is, the offset compression force acts upon the optical fiber 19 to produce a linear birefringence. The polarization plane (vibration plane of light) is controlled to a position passing through the center of the second coating layer 20 and that of the optical fiber 19. It is, therefore, possible to realize a simpler high-birefringence optical fiber structure through the direct utilization of the birefringence.

In the case where an optical fiber cable is coiled and it is applied to a magnetic sensor utilizing the Dopper effect, the optical fiber cable 19 is off-centered relative to a center side of its turn section as seen from the second coating layer 20 and, by the turn section of the optical fiber cable, it is possible to eliminate an unbalance of a compression force acting upon the optical fiber 19. By such a bending operation, it is possible to cancel the birefringence caused before bending is done, so that such birefringence can be reduced in comparison with a not-off-centered optical fiber cable.

Figure 5:
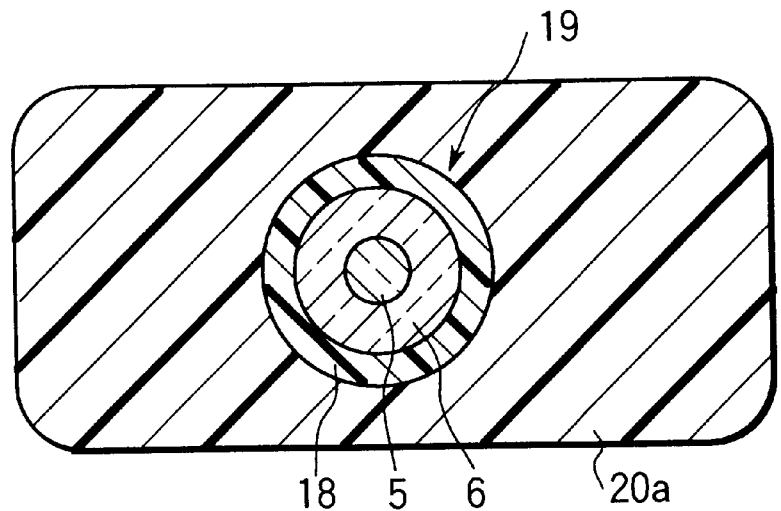
FIG. 5 is a view, in vertical cross-section, showing a variant of the optical fiber cable of the fourth embodiment.

Although, in the present embodiment, the second coating layer 20 is made circular in cross-section, use can be made of a second coating layer 20a whose cross-section is made rectangular as shown in FIG. 5.

Figure 6:
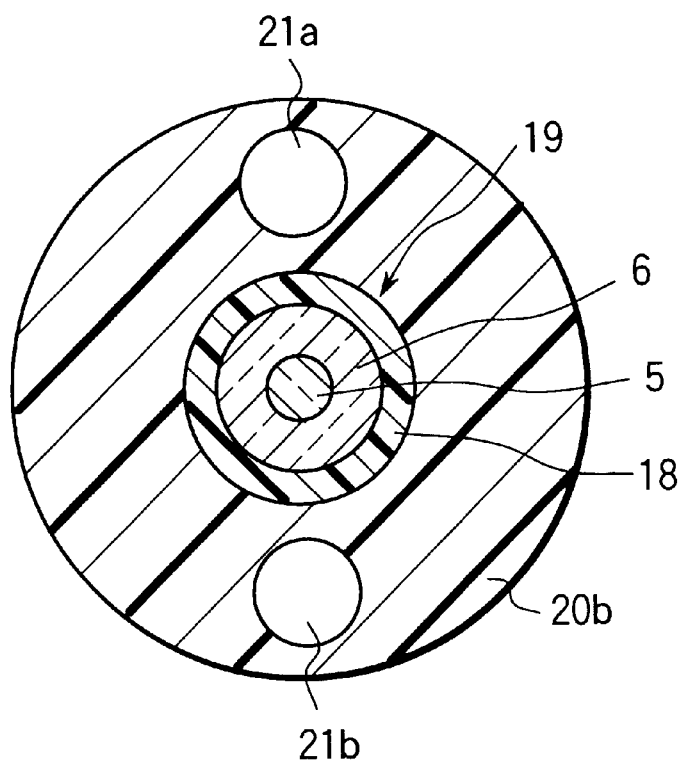
FIG. 6 is a view, in vertical cross-section, showing a variant of the optical fiber cable of the fourth embodiment.

It is also possible to obtain the same advantage by a second coating layer 20b of a configuration as shown in FIG. 6. That is, the second coating layer 20b partially includes through holes 21a, 21b, so that the thickness of the second coating layer 20b differs around an optical fiber 19. For this reason, it is possible to impart a polarizing plane of a given direction to the optical fiber 19.

(5) Fifth Embodiment

The fifth embodiment of the present invention will be explained below with reference to FIG. 7.

In the fifth embodiment, an optical fiber 23 is created in a way to include a first coating layer 22 of silicone rubber on a cladding around a core 5, the silicone rubber being lower in Young's modulus than the core 5 and cludding 6. The first coating layer, after being twisted, is circumferentially covered with a second coating layer 24 which is higher in Young's modulus than the first coating layer. Further, a third coating layer 25 of fluorine resin is covered circumferentially on the second coating layer 24.

The fifth embodiment has the following advantage. That is, in the fifth embodiment, the third coating layer 25 of fluorine resin is covered around the second coating layer 24 and it is possible to improve a resistance to chemicals and thus to extend the life of the optical fiber cable. Effective is the use of such optical fiber cable as a sensing means in a high-pressure insulating device where an $SF_6$ gas is oftener used.

(6) Sixth Embodiment

The sixth embodiment of the present invention will be explained below with reference to FIG. 8.

The sixth embodiment is suitably applicable to a device where an optical fiber cable is used in a bending state such as a turned state.

The optical fiber cable of the sixth embodiment has a guide 27 for retaining the optical fiber in a coiled state as shown in FIG. 8. The guide 27 has a groove 28 and is comb-like in cross-section. The guide 27 is molded from a rubber material by, for example, an extrusion method. The groove width of the guide 27 is set within a range of 20 times the external diameter of a finished optical fiber 26. The optical fiber 26 is held in the groove 28 of the guide 27 and a cover 29 is fitted into the guide 29 and closed in place.

The sixth embodiment of the present invention has the following operational effect and advantage.

That is, the optical fiber 26 is restricted by the groove 28 from being displaced and it is possible to suppress a kink from being produced when the optical fiber 26 is twisted. In consequence, it is possible to mount the optical fiber 26 in such a state where there arise neither a dispersion nor a birefringence.

Further, since the guide 27 is molded by the extrusion method from a rubber material, any external force is absorbed by the guide 27, so that the optical fiber 26 is protected. The guide 27 of the rubber material has a flexible property, thus imparting an added freedom to the mount configuration of the optical fiber structure.

It is possible to prevent the optical fiber from being dropped out of the groove of the guide 10 by the cover 29.

As the optical fiber 26 use may be made of one obtained by covering a cladding 6 around a core 5 with a first coating layer of silicon rubber lower in Young's modulus than the core and cladding 6 and twisting a resultant structure or another obtained by covering the first coating layer with a second coating layer.

(7) Seventh Embodiment

The seventh embodiment of the present invention will be explained below with reference to FIG. 9.

The seventh embodiment of the present invention relates to a device for retaining an optical fiber in a bending state as in the case of the sixth embodiment of the present invention. Even in the seventh embodiment, an optical fiber 26 is retained in place in a guide 30 as in the sixth embodiment.

In the seventh embodiment, however, a guide 30 has a groove 31 V-shaped in cross-section as shown in FIG. 9. In the case where the optical fiber 26 is fitted in the groove 31 of the guide 30, the optical fiber 26 is supported in a two-linear-contact relation by mutually facing faces of the V-shaped groove 31.

According to the seventh embodiment, it is possible to obtain an operational effect and advantage.

That is, the optical fiber 26 is held, under its own weight, in the groove 31 of the guide 30 and restricted from being curled, so that it is possible to suppress any kink produced when the optical fiber 26 is twisted.

When, in particular, the optical fiber 1 is used in a location where it has to be curved, even if any tension force acts upon the optical fiber 1, the force is supported in the two-liner-contact relation and a reaction force from each face of the V-shaped groove acts toward a center direction of the optical fiber 26, so that a compression force balance is maintained. For this reason, it is possible to reduce a birefringence through the cancellation of it.

(8) Eighth Embodiment

The eighth embodiment of the present invention will be explained below with reference to FIG. 10.

The eighth embodiment relates to an optical fiber coil with an optical fiber provided as a multi-turned one. As set out above, the optical fiber is used for various kinds of sensors and, in particular, such optical fiber coil is used as a sensor for detecting a magnetic field, electric current and rotation motion.

As the optical fiber coil of the eight embodiment, use is made of one using a type of guide as shown in the sixth embodiment. The eighth embodiment will now be explained below.

Figure 10:
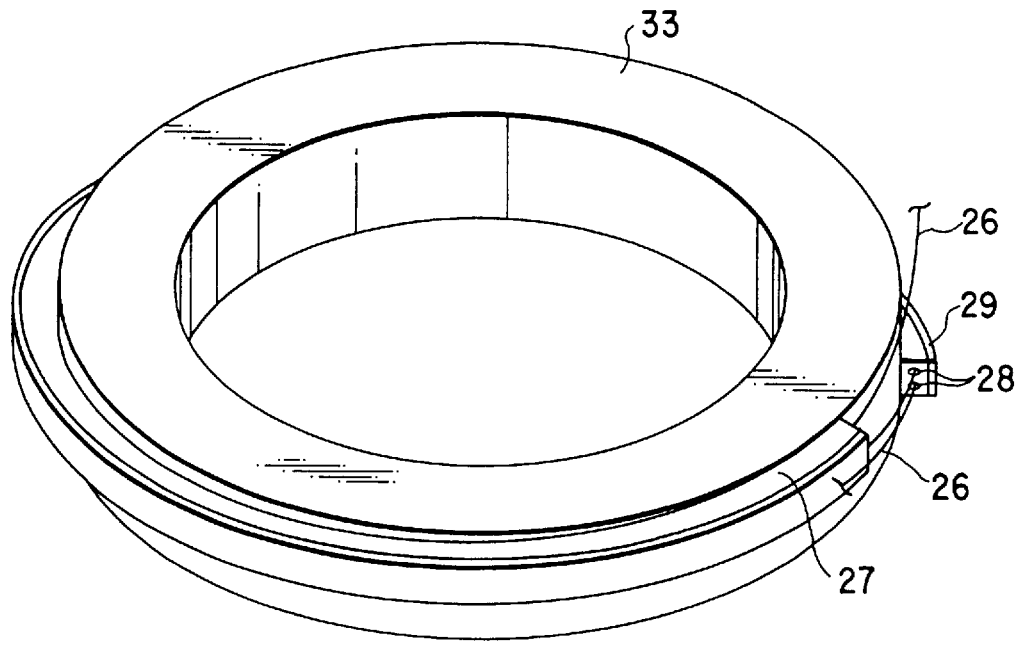
FIG. 10 is a perspective view showing an optical fiber coil according to an eighth embodiment of the present invention.

In FIG. 10, reference numeral 33 shows a ring-like former having a rectangular cross-section. The guide 27 of a rubber material is wrapped around the outer periphery of the former 33 with the open side of a groove 28 directed outward. The guide 27 is obliquely so wrapped that, as viewed from its "start" side toward its "end" side, a "one-groove" distance per circumference of the guide is displaced in an up/down direction of the coiled optical fiber with some gap left between the "start" side and the "end" side.

The optical fiber 26 is held in the groove 28 of the guide 27 in a way to be spirally coiled long the groove 28. Since the gap is left between the "start" side and the "end" side, no abrupt bend is encountered from a first circumference to a second circumference and from the second circumference to a third circumference of the coiled optical fiber 26. After the optical fiber 26 is wrapped along the groove of the guide 27, a cover 29 is fitted on the guide 27.

The eighth embodiment of the present invention has the following operational effect and advantage. That is, the guide 27 is spirally wrapped on the former in a way to be spaced by the one-groove distance per circumference as set out above and, further, no abrupt bend of the optical fiber 26 is provided due to the presence of the gap, it is possible to suppress the generation of a birefringence in the optical fiber coil.

By using such optical fiber coil of the sensor section it is possible to reduce an error produced due to the birefringence and hence to realize a sensor of high accuracy.

In the eight embodiment, if the guide 27 is molded from silicone rubber by an extrusion method, it provides an elastic surface of contact with the optical fiber 26 and, at the same time, a seamless groove can be achieved, by the extrusion method, in a continuous molding process. It is, therefore, possible to prevent an abrupt bend of the optical fiber 26 which may be caused if a seamed groove is used.

(9) Ninth Embodiment

Figure 11:
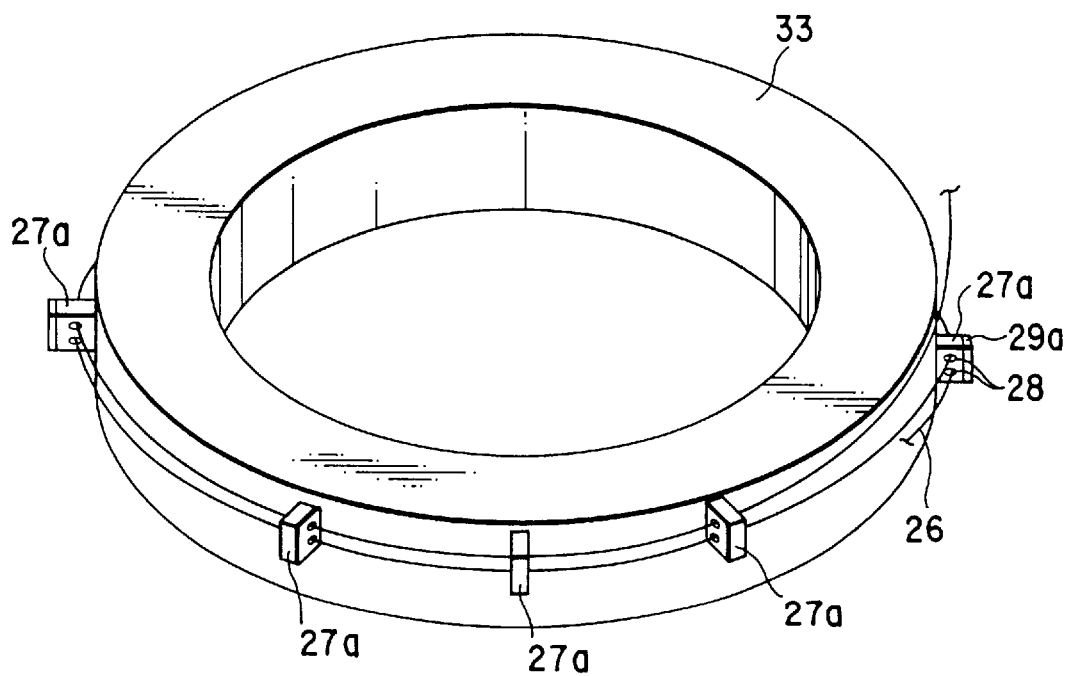
FIG. 11 is a perspective view showing an optical fiber coil according to a ninth embodiment of the present invention.
Figure 12:
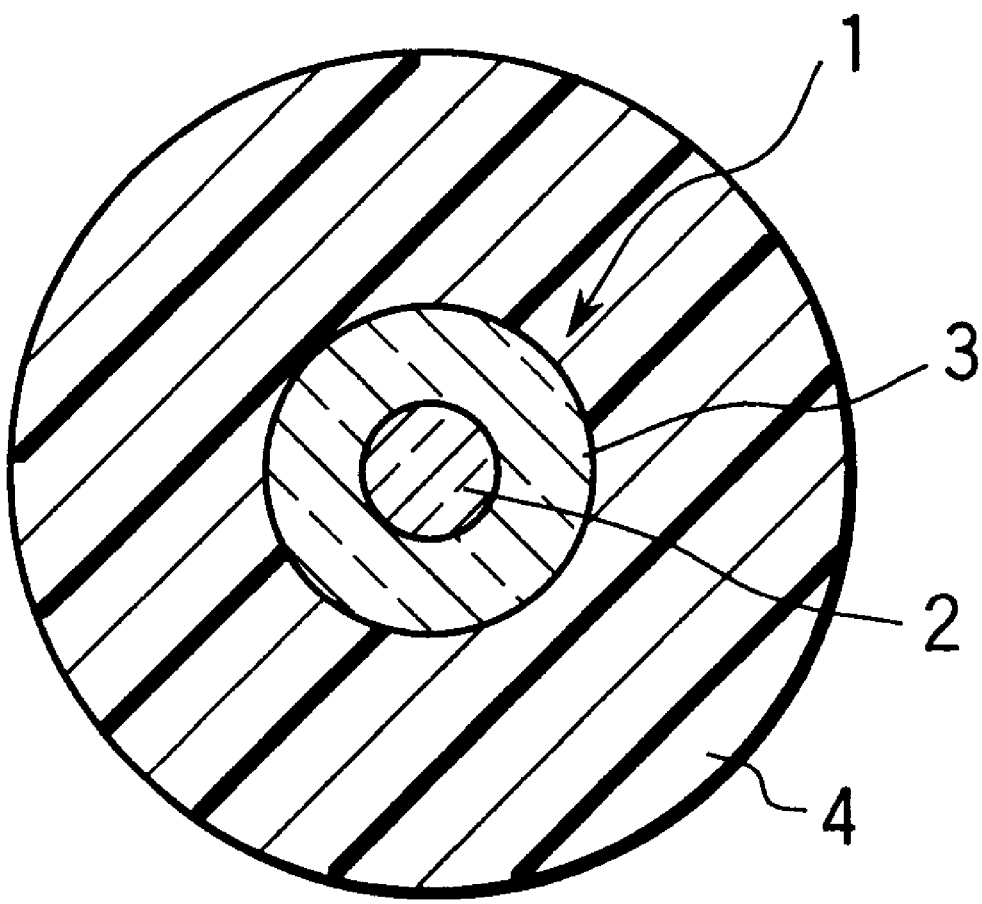
FIG. 12 is a view, vertical cross-section, showing one example of a conventional optical fiber cable.

Out of the other possible embodiments of the present invention, one embodiment will be explained blow, as a ninth embodiment, with reference to FIG. 11.

This is a variant of the eight embodiment. Although, in the eighth embodiment, the guide 27 is both longer and band-like and is wrapped around a substantially full circumference of the former 33, the ninth embodiment is of such a type that a plurality of short guides 27a are arranged on the outer peripheral surface of the former 33 at given intervals as shown in FIG. 11.

In the ninth embodiment, an optical fiber 26 is coiled along corresponding grooves of each guide 27a in a retained way. A cover 92a is attached the guide 27a.

The ninth embodiment has the following advantage.

That is, the optical fiber 1 is not necessarily supported on a full circumference of the ninth embodiment and adequate support can be gained even if the optical fiber is partly retained in place. When, in particular, the guides 27a are mounted at the given intervals as set out above in conjunction with the ninth embodiment, if a greater frictional force acts between the optical fiber 26 and the guide 27a, it is possible to prevent an excessive outer force which comes from the guide 27a from acting upon the optical fiber 26 and hence to reduce a birefringence.

The present invention is not restricted to the above-mentioned first to ninth embodiments and can be properly changed or modified depending upon the size, shape, material, number of each associated member.

For example, the respective coating layer may be formed either from the same material or from difference materials. As shown in FIG. 6, it is effective to provide an air gap 9a between the coating layer and the adjacent coating layer.

As set out above, according to the present invention, the optical fiber cable is provided which can be accurately retained in place in a twisted state and prevent a dispersion and birefringence.

Further, it is also possible to provide an optical fiber coil which can prevent the unwanted bending of an optical fiber resulting from the dispersion and birefringence.

In another aspect of the present invention it is possible to provide a method for manufacturing an optical fiber cable which produces less dispersion and less birefringence.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical fiber cable comprising:
   an optical fiber having a core structure and a first coating layer covering the core structure; and
   a coating layer structure including a second coating layer covering the first coating layer, the second coating layer being higher in Young's modulus than the first coating layer,
   wherein said optical fiber has been twisted before forming the second coating layer on said first coating layer of the optical fiber.

2. An optical fiber cable comprising:

an optical fiber having a core structure and a first coating layer covering the core structure; and a coating layer structure including a second coating layer covering the first coating layer, the second coating layer being so formed as to produce no stress, in a cured/shrunk state, relative to the first coating layer, wherein said optical fiber has been twisted before forming the second coating layer on said first coating layer of the optical fiber.

3. The optical fiber according to claim 2, wherein the second coating layer is so extrusion-formed as to have an inner diameter made substantially equal, in a cured/shrunk state, to an outer diameter of the first coating layer.

4. An optical fiber comprising:

an optical fiber according to claim 2; and a guide having at least one groove in which the optical fiber is held in place.

5. The optical fiber cable according to claim 4, wherein the groove is V-shaped in cross-section.

6. The optical fiber cable according to claim 4, wherein the guide is made of a flexible material.

7. The optical fiber cable according to claim 4, further including a cover for closing the groove.

8. An optical fiber coil comprising a former and a guide provided on and around the former and having a groove formed along a turn direction of an optical fiber according to claim 4, the groove holding the optical fiber in place.

9. The optical fiber coil according to claim 8, wherein the groove is V-shaped in cross-section.

10. An optical fiber cable comprising:

an optical fiber having a core structure and a first coating layer covering the core structure; and a coating layer structure having a second coating layer covering the first coating layer, the second coating layer being so formed as to produce a given polarization plane in the optical fibers wherein said optical fiber has been twisted before forming the second coating layer on said first coating layer of the optical fiber.

11. The optical fiber cable according to claim 10, wherein the second coating layer has a varying thickness.

12. The optical fiber cable according to claim 11, wherein the second coating layer is off-centered relative to the optical fiber and so controlled as to allow a polarization plane to be oriented in a direction parallel to an off-centered direction.

13. The optical fiber cable according to claim 12, wherein the off-centered direction of the second coating layer is opposite relative to an inside of the optical fiber cable when the optical fiber cable is bent.

14. The optical fiber cable according to claim 13, wherein an off-centered amount of the second coating layer is so set as to allow the polarization plane to be substantially canceled when the optical fiber is bent.

15. The optical fiber cable according to claim 11, wherein an outer configuration of the second coating layer layer is rectangular.

16. An optical fiber comprising:

an optical fiber according to claim 10 and a guide having at least one groove in which the optical fiber is held in place.

17. The optical fiber cable according to claim 16, wherein the groove is V-shaped in cross-section.

18. The optical fiber cable according to claim 16, wherein the guide is made of a flexible material.

19. The optical fiber cable according to claim 16, further including a cover for closing the groove.

20. An optical fiber coil comprising a former and a guide provided on and around the former and having a groove formed along a turn direction of an optical fiber according to claim 16, the groove holding the optical fiber in place.

21. The optical fiber coil according to claim 20, wherein the groove is V-shaped in cross-section.

22. An optical fiber cable comprising:

an optical fiber having a core structure and a first coating layer covering the core structure; and a coating layer structure having an outermost coating layer formed of a fluorine resin, wherein said optical fiber has been twisted before forming the outermost coating layer on said first coating layer of the optical fiber.

23. A method for manufacturing an optical fiber cable, comprising the steps of:

forming an optical fiber having a first coating layer provided on and around a core structure thereof; and forming a second coating layer, by an extrusion process, on an outside of the first coating layer of the optical fiber;

further comprising a step of twisting the optical fiber before the step of forming the second coating layer on the first coating layer of the optical fiber.

24. The method according to claim 23, wherein a die for the extrusion process is so shaped as to allow an inner diameter of the second coating layer to be made substantially equal to an outer diameter of the first coating layer when the second coating layer is in a cured/shrunk state.

* * * * *